United States Patent
Zhang et al.

(10) Patent No.: US 12,289,802 B2
(45) Date of Patent: Apr. 29, 2025

(54) MOBILE TERMINATED (MT) PAGING PROCEDURE FOR IP MULTIMEDIA SUBSYSTEM (IMS) CALLS

(71) Applicant: QUALCOMM Incorporated, San Diego, CA (US)

(72) Inventors: Juan Zhang, Beijing (CN); Haris Zisimopoulos, London (GB); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/801,507

(22) PCT Filed: Apr. 23, 2020

(86) PCT No.: PCT/CN2020/086329
§ 371 (c)(1),
(2) Date: Aug. 22, 2022

(87) PCT Pub. No.: WO2021/212398
PCT Pub. Date: Oct. 28, 2021

(65) Prior Publication Data
US 2023/0081647 A1 Mar. 16, 2023

(51) Int. Cl.
*H04W 8/26* (2009.01)
*H04L 9/40* (2022.01)
*H04L 65/1016* (2022.01)
*H04W 68/02* (2009.01)

(52) U.S. Cl.
CPC ............. *H04W 8/26* (2013.01); *H04L 63/101* (2013.01); *H04L 65/1016* (2013.01); *H04W 68/02* (2013.01)

(58) Field of Classification Search
CPC ......... H04W 8/26; H04W 68/02; H04W 8/18; H04W 8/183; H04W 8/20; H04W 12/08;
(Continued)

(56) References Cited

U.S. PATENT DOCUMENTS

| 10,609,613 B2 | 3/2020 | Gholmieh et al. |
| 2015/0045006 A1* | 2/2015 | Khan ............... H04W 4/12 455/414.1 |

(Continued)

FOREIGN PATENT DOCUMENTS

| CN | 105723757 A | 6/2016 |
| CN | 108260124 A | 7/2018 |

(Continued)

OTHER PUBLICATIONS

Supplementary European Search Report—EP20932211—Search Authority—Munich—Dec. 14, 2023.

(Continued)

*Primary Examiner* — Mohamed A Kamara
(74) *Attorney, Agent, or Firm* — QUALCOMM Incorporated

(57) ABSTRACT

A method of wireless communication by a UE (user equipment) includes transmitting a list to an IMS (IP multimedia subsystem) service center. The list includes multiple mobile station international subscriber directory numbers (MSISDNs). The method also includes receiving a paging message indicating different causes for the paging message. A method of wireless communications by a network determines whether a call initiator is in a list received from a UE (user equipment) in response to receiving a mobile terminated call for the UE. The list comprises multiple mobile station international subscriber directory numbers (MSISDNs). The network also transmits a message to the UE indicating whether the mobile terminated call is from one of the MSISDNs in the list.

16 Claims, 9 Drawing Sheets

600 →

602 — TRANSMIT A LIST TO AN IMS (IP MULTIMEDIA SUBSYSTEM) SERVICE CENTER, THE LIST COMPRISING MULTIPLE MOBILE STATION INTERNATIONAL SUBSCRIBER DIRECTORY NUMBERS (MSISDNS)

604 — RECEIVE A PAGING MESSAGE INDICATING DIFFERENT CAUSES FOR THE PAGING MESSAGE

(58) Field of Classification Search
CPC ... H04W 76/12; H04L 63/101; H04L 65/1016
See application file for complete search history.

(56) References Cited

U.S. PATENT DOCUMENTS

| | | | |
|---|---|---|---|
| 2015/0172895 A1 | 6/2015 | Sengupta et al. | |
| 2021/0105866 A1* | 4/2021 | Kavuri | H04W 76/27 |
| 2021/0392616 A1* | 12/2021 | Stojanovski | H04W 68/02 |
| 2022/0369402 A1* | 11/2022 | Nimmala | H04W 76/12 |
| 2023/0056442 A1* | 2/2023 | Ly | H04W 24/08 |

FOREIGN PATENT DOCUMENTS

| | | |
|---|---|---|
| CN | 109392092 A | 2/2019 |
| CN | 109818917 A | 5/2019 |
| TW | 201404094 A | 1/2014 |
| WO | 2008125062 A1 | 10/2008 |
| WO | 2018005419 A1 | 1/2018 |
| WO | 2018035462 A1 | 2/2018 |

OTHER PUBLICATIONS

3GPP TR 23.761: "3rd Generation Partnership Project; Technical Specification Group Services and System Aspects; Study on system enablers for devices having multiple Universal Subscriber Identity Modules (USIM) (Release 17)", V0.3.0 (Jan. 2020), Jan. 28, 2020 (Jan. 28, 2020), pp. 1-37, Section 6.1.
International Search Report and Written Opinion—PCT/CN2020/086329—ISA/EPO—Jan. 26, 2021.

* cited by examiner

MOBILE TERMINATED (MT) PAGING PROCEDURE FOR IP MULTIMEDIA SUBSYSTEM (IMS) CALLS

CROSS-REFERENCE TO RELATED APPLICATION

The present application is a National Stage of PCT Patent Application No. PCT/CN2020/086329, filed on Apr. 23, 2020, and titled "MOBILE TERMINATED (MT) PAGING PROCEDURE FOR IP MULTIMEDIA SUBSYSTEM (IMS) CALLS," the disclosure of which is expressly incorporated by reference in its entirety.

FIELD OF THE DISCLOSURE

Aspects of the present disclosure generally relate to wireless communications, and more particularly to techniques and apparatuses for 5G new radio (NR) solutions to differentiate mobile terminated calls in a paging procedure for IP multimedia subsystem (IMS) voice calls.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method of wireless communication by a UE (user equipment) includes transmitting a list to an IMS (IP multimedia subsystem) service center. The list includes multiple mobile station international subscriber directory numbers (MSISDNs). The method also includes receiving a paging message indicating different causes for the paging message.

In another aspect of the present disclosure, a method of wireless communication by an IMS (IP multimedia subsystem) includes determining a cause of a page in response to receiving a mobile terminated call for a UE (user equipment). The method also includes setting a specific DSCP (differentiated services code point) value in an IP header to indicate the cause. The method further includes transmitting the IP header to an SMF (session management function).

In another aspect of the present disclosure, a method of wireless communication by an SMF (session management function) includes determining a paging cause for a mobile terminated call based on a specific DSCP (differentiated services code point) value. The paging cause indicates a cause of the mobile terminated call. The method also includes transmitting a paging message including the paging cause to the UE.

In another aspect of the present disclosure, a method of wireless communication by a network includes determining whether a call initiator is in a list received from a UE (user equipment) in response to receiving a mobile terminated call for the UE. The list includes multiple mobile station international subscriber directory numbers (MSISDNs). The network also includes transmitting a message to the UE indicating whether the mobile terminated call is from one of the MSISDNs in the list.

In another aspect of the present disclosure, a UE (user equipment) for wireless communications includes a memory and at least one processor operatively coupled to the memory. The memory and the processor(s) are configured to transmit a list to an IMS (IP multimedia subsystem) service center. The list includes multiple mobile station international subscriber directory numbers (MSISDNs). The UE is also configured to receive a paging message indicating different causes for the paging message.

In another aspect of the present disclosure, a IMS (IP multimedia subsystem) includes a memory and at least one processor operatively coupled to the memory. The memory and the processor(s) are configured to determine a cause of a page in response to receiving a mobile terminated call for a UE (user equipment). The IMS is also configured to set a specific DSCP (differentiated services code point) value in an IP header to indicate the cause. The IMS is further configured to transmit the IP header to an SMF (session management function).

In another aspect of the present disclosure, a SMF (session management function) for wireless communications includes a memory and at least one processor operatively coupled to the memory. The memory and the processor(s) are configured to determine a paging cause for a mobile terminated call based on a specific DSCP (differentiated services code point) value. The paging cause indicates a cause of the mobile terminated call. The SMF is also configured to transmit a paging message including the paging cause to the UE.

In another aspect of the present disclosure, a network for wireless communications includes a memory and at least one processor operatively coupled to the memory. The memory and the processor(s) are configured to determine whether a call initiator is in a list received from a UE (user equipment) in response to receiving a mobile terminated call for the UE. The list includes multiple mobile station international subscriber directory numbers (MSISDNs). The network is also configured to transmit a message to the UE indicating whether the mobile terminated call is from one of the MSISDNs in the list.

In another aspect of the present disclosure, a UE (user equipment) includes means for transmitting a list to an IMS (IP multimedia subsystem) service center. The list includes multiple mobile station international subscriber directory numbers (MSISDNs). The UE also includes means for receiving a paging message indicating different causes for the paging message.

In another aspect of the present disclosure, a IMS (IP multimedia subsystem) includes means for determining a cause of a page in response to receiving a mobile terminated call for a UE (user equipment). The IMS also includes means for setting a specific DSCP (differentiated services code point) value in an IP header to indicate the cause. The IMS further includes means for transmitting the IP header to an SMF (session management function).

In another aspect of the present disclosure, a SMF (session management function) includes means for determining a paging cause for a mobile terminated call based on a specific DSCP (differentiated services code point) value. The paging cause indicating a cause of the mobile terminated call. The SMF also includes means for transmitting a paging message including the paging cause to the UE.

In another aspect of the present disclosure, a network for wireless communication includes means for determining whether a call initiator is in a list received from a UE (user equipment) in response to receiving a mobile terminated call for the UE. The list includes multiple mobile station international subscriber directory numbers (MSISDNs). The network also includes mean for transmitting a message to the UE indicating whether the mobile terminated call is from one of the MSISDNs in the list.

In another aspect of the present disclosure, a non-transitory computer-readable medium with program code recorded thereon is disclosed. The program code is executed by a UE (user equipment) and includes program code to transmit a list to an IMS (IP multimedia subsystem) service center. The list includes multiple mobile station international subscriber directory numbers (MSISDNs). The UE also includes program code to receive a paging message indicating different causes for the paging message.

In another aspect of the present disclosure, a non-transitory computer-readable medium with program code recorded thereon is disclosed. The program code is executed by a IMS (IP multimedia subsystem) and includes program code to determine a cause of a page in response to receiving a mobile terminated call for a UE (user equipment). The IMS also includes program code to set a specific DSCP (differentiated services code point) value in an IP header to indicate the cause. The IMS further includes program code to transmit the IP header to an SMF (session management function).

In another aspect of the present disclosure, a non-transitory computer-readable medium with program code recorded thereon is disclosed. The program code is executed by a SMF (session management function) and includes program code to determine a paging cause for a mobile terminated call based on a specific DSCP (differentiated services code point) value. The paging cause indicates a cause of the mobile terminated call. The SMF also includes program code to transmit a paging message including the paging cause to the UE.

In another aspect of the present disclosure, a non-transitory computer-readable medium with program code recorded thereon is disclosed. The program code is executed by a network and includes program code to determine whether a call initiator is in a list received from a UE (user equipment) in response to receiving a mobile terminated call for the UE. The list includes multiple mobile station international subscriber directory numbers (MSISDNs). The network also includes program code to transmit a message to the UE indicating whether the mobile terminated call is from one of the MSISDNs in the list.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
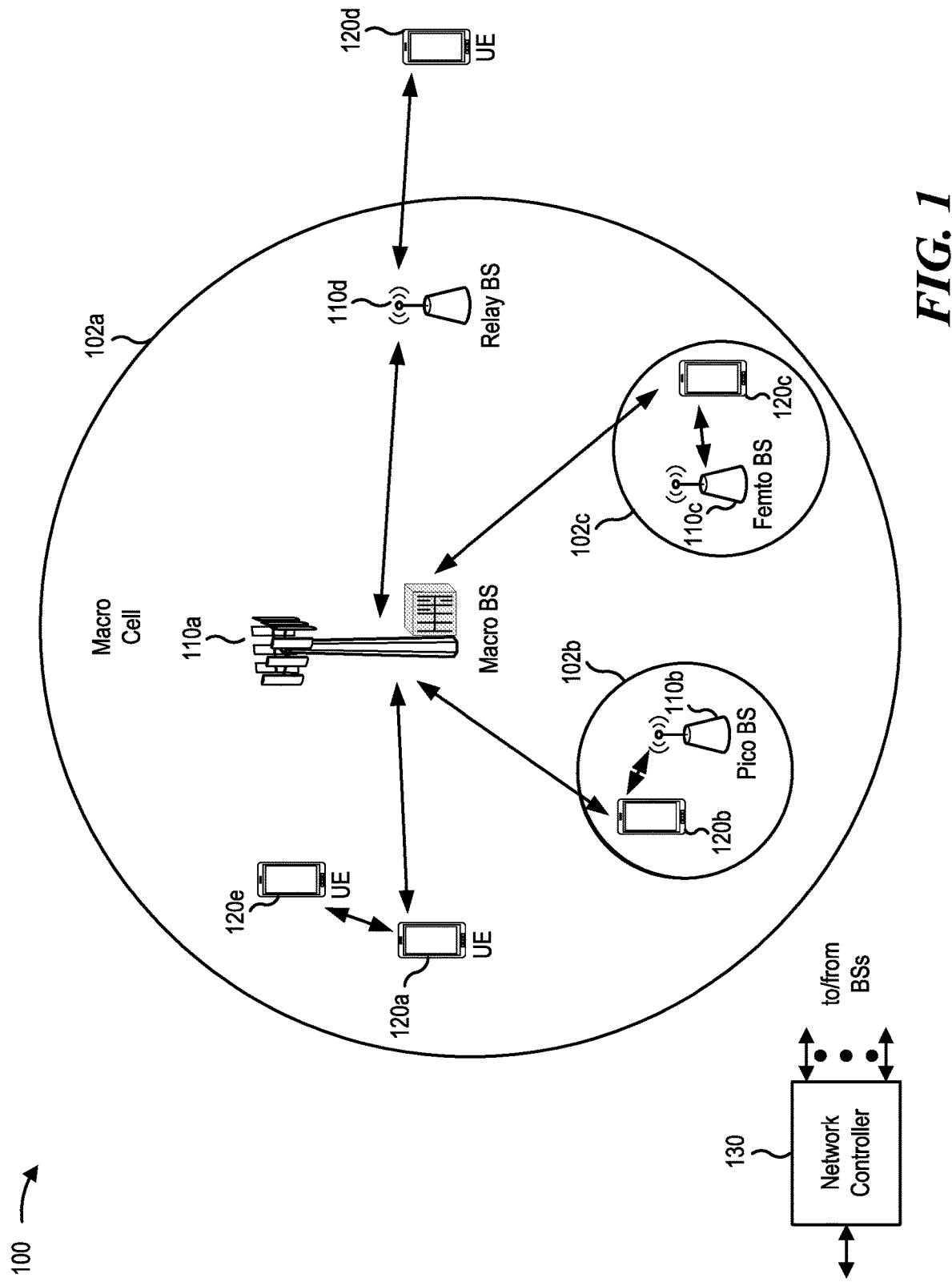
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

An IP multimedia subsystem (IMS) architecture can enable voice over IP calls. An issue with mobile terminated IMS calls is that a paging message can only indicate whether the call is a voice call or another type of call, such as an IMS short message service (SMS) call or IMS signaling for IMS service. When the UE receives the paging message, the UE only knows whether the call is for IMS voice. There is a concern that only including information about whether the page is for IMS voice may not be sufficient to adequately allow the user to make an informed decision about whether to accept the call. It would be helpful for the page to indicate more information about who placed the call. Then, the user can decide whether the paging is important. According to the present disclosure, a paging message for a mobile terminated IMS call indicates whether a caller is on a user created whitelist or blacklist.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
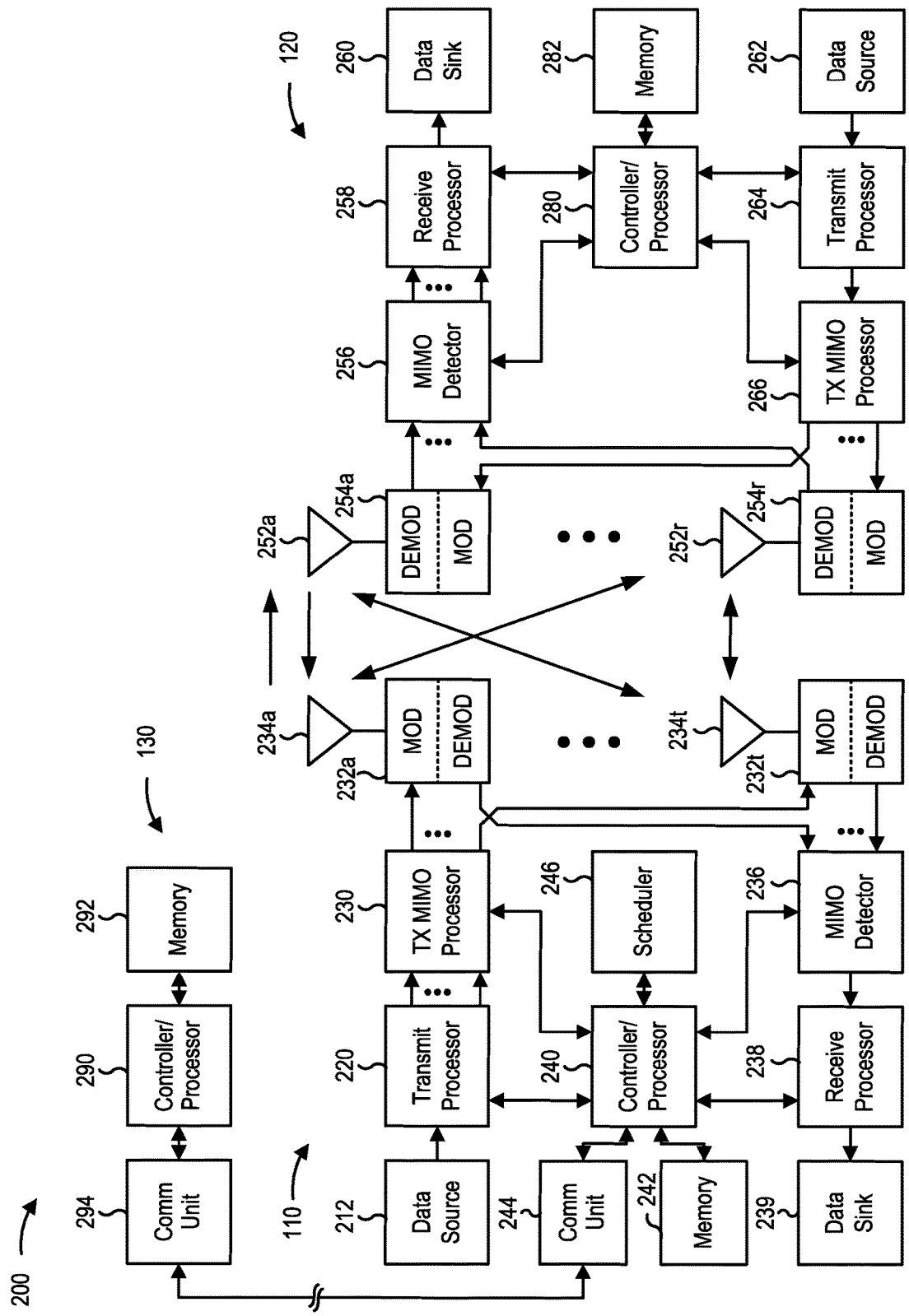
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for non-linearities, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for transmitting, means for suspending service, means for maintaining service, means for determining, means for setting. Such means may include one or more components of the UE 120, network controller 130 or base station 110 described in connection with FIG. 2.

As indicated above, FIG. 2 is provided merely as an example. Other examples may differ from what is described with regard to FIG. 2.

Mobile devices can include multiple USIM (universal subscriber identity module) cards (or UICCs (universal integrated circuit cards)) to enable wireless communications with different cellular networks. For example, a UE may have a first USIM card for personal use with a first service provider and a second USIM card for office calls with a second service provider. For a multi-subscriber identity module (SIM) user equipment (UE), while USIM A is in connected mode, the UE periodically checks for paging for USIM B. If the multi-SIM UE accepts a call for USIM B to communicate with the network for USIM B, the ongoing services in the current system (e.g., USIM A) may be interrupted.

Figure 3:
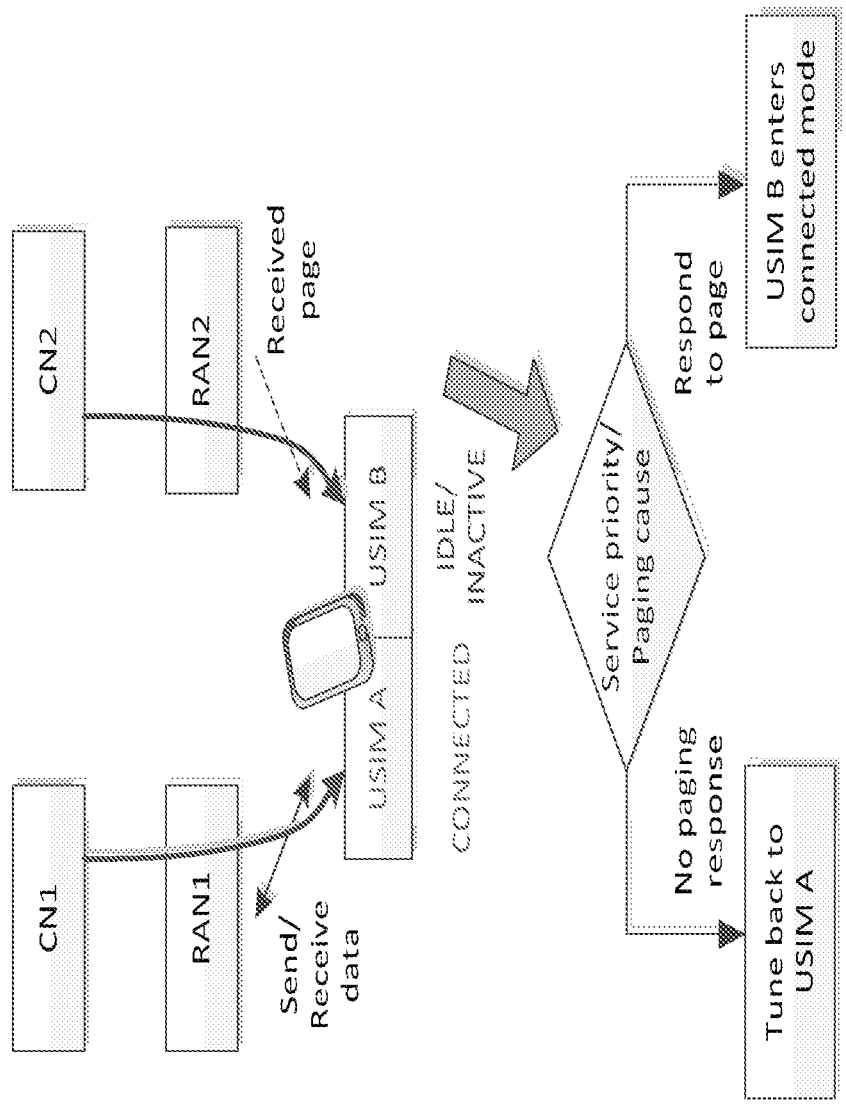
FIG. 3 is a diagram illustrating a multi-subscriber identity module (SIM call) scenario, in accordance with aspects of the present disclosure.

In FIG. 3, a multi-SIM UE is communicating with a core network (CN1) of the service provider for USIM A, via a radio access network (RAN1) of the service provider for USIM A. The multi-SIM UE is in connected mode for USIM A. When a page arrives from a core network (CN2) via a radio access network (RAN2) associated with the service provider for USIM B, while the UE is in idle/inactive mode for USIM B, the user decides how to handle the incoming page. If the user decides not to respond to the page, the UE can tune back to USIM A and remain in connected mode with USIM A. If the user accepts the page, the UE enters connected mode for USIM B and interrupts the service for USIM A.

Figure 4:
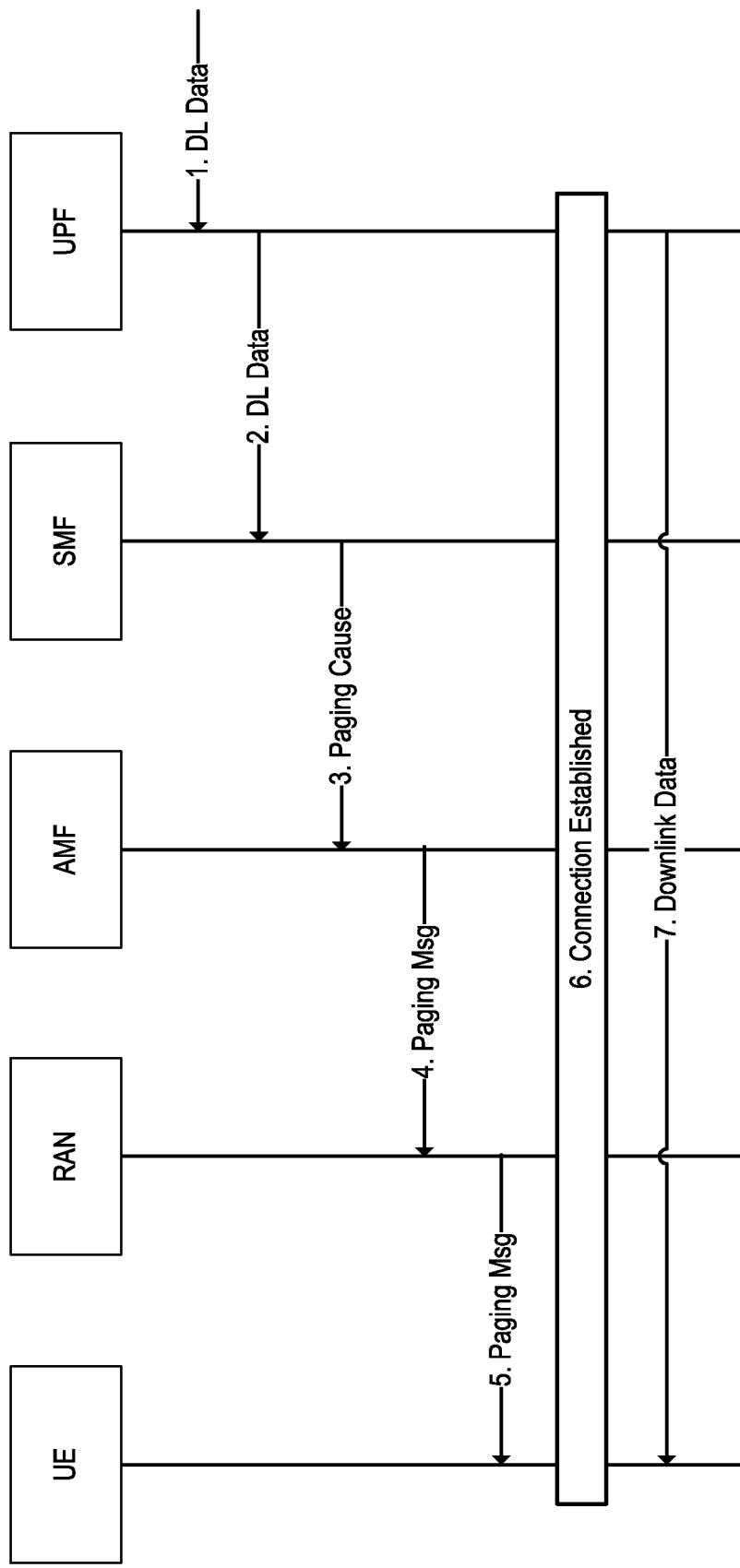
FIG. 4 is a call flow diagram illustrating a paging procedure, in accordance with aspects of the present disclosure.

If helpful information is provided in the paging message for USIM B, the UE can decide whether to communicate with the network for USIM B and avoid the unnecessary interruption of service for USIM A. As seen in FIG. 4, information can be placed in the paging message, for example, to indicate whether the call is a voice call or other type of call, such as an SMS call. At time 1, a user plane function (UPF) of a core network receives downlink (DL) data packets. At time 2, the UPF forwards the downlink data packets to a session management function (SMF) in the core network. The SMF determines the paging cause based on the differentiated services code point (DSCP) value in the type of service (TOS) (IPv4)/traffic class (TC) (IPv6) value from the IP header. At time 3, the SMF sends the paging cause to an access and mobility management function (AMF) of the core network. At time 4, the AMF includes the paging cause in the paging message for the radio access network (RAN). At time 5, the RAN sends the paging message with the paging cause to the UE. At time 6, the connection is established in a conventional manner, and at time 6, downlink data can be sent from the UPF to the UE.

A shortcoming of the solution shown in FIG. 4 is that the DSCP value in the IP header only differentiates IP multimedia subsystem (IMS) voice from IMS short message service (SMS) and IMS signaling for IMS service. When the UE receives the paging cause, the UE can only tell whether the call is for IMS voice. There is a concern that only including information about whether the page is for IMS voice may not allow the user to make an informed decision about accepting the call. It may be helpful for the page to indicate information about who placed the call. Then, the user can decide whether the paging is important and decide whether to continue the service with USIM A, in the case of a multi-SIM UE.

According to the present disclosure, a paging message indicates whether a caller is on a whitelist or blacklist created by a user. In order to enable this functionality, a service provider network sends a public land mobile network (PLMN) specific paging cause value and the meaning of the paging cause value to the UE in the policy information. In order words, for each network, a different paging cause value can be defined to indicate whether a caller is on a whitelist or blacklist.

Figure 5:
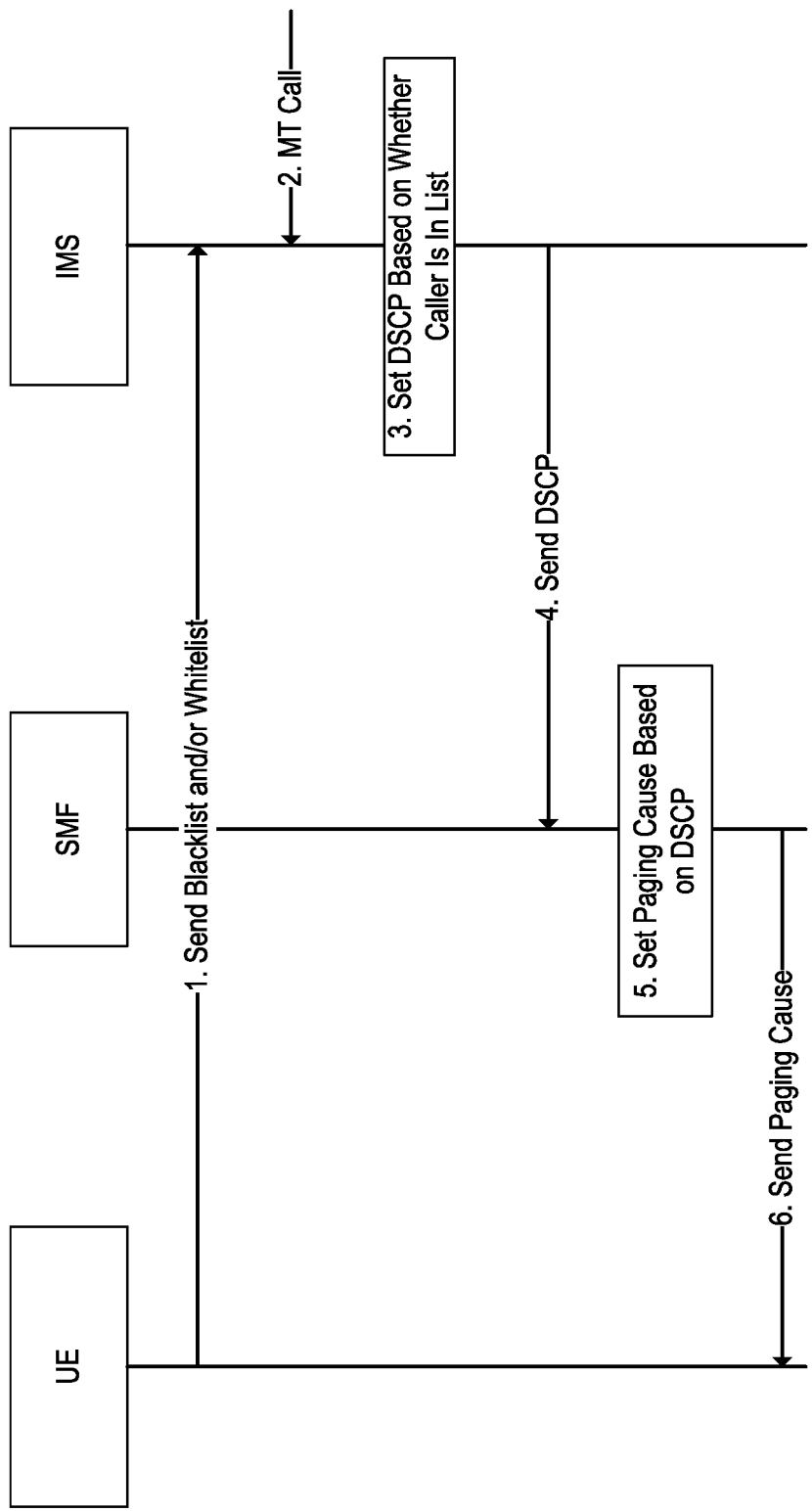
FIG. 5 is a call flow diagram illustrating a paging procedure for a mobile terminated IMS (IP multimedia subsystem) call, in accordance with aspects of the present disclosure.

Referring now to FIG. 5, an explanation of an exemplary process for handling a mobile terminated call is provided. It is noted that the process can operate in a multi-SIM environment or a single SIM environment. At time 1, a UE sends a whitelist and/or a blacklist to an IMS service center via application layer signaling. The whitelist includes a list of phone numbers (e.g., mobile station international subscriber directory numbers (MSISDN)(s)) considered to be important by the user. The blacklist includes a list of MSISDN(s) considered to not be important by the user.

At time 2, when the mobile terminated (MT) call is received, the proxy-call session control function (P-CSCF) in the IMS system checks with the IMS service center to determine if the MSISDN of the IMS voice caller is in the whitelist or blacklist. At time 3, the P-CSCF sets a different DSCP value in the IP header to indicate whether the caller is in the whitelist, blacklist, or neither. At time 4, the IMS system sends the IP packet (with the IP header) to a SMF in the core network. At time 5, the SMF determines if a different paging cause should be set based on the different DSCP value in the IP header. At time 6, the SMF sends the paging message to the UE, with the appropriate paging cause, which is defined according to the policy of the service provider network.

When the UE receives the paging cause over the radio interface, the UE can decide whether to accept the IMS voice call based on the paging cause. For example, if the paging cause indicates the caller is in the whitelist, the UE may accept the page. In the case of a multi-SIM UE, the UE may enter connected mode with USIM B and enter idle/inactive mode with USIM A. In another example, if the paging cause indicates the caller is in the blacklist, the UE may decide to ignore the page. In the case of a multi-SIM UE, the UE may remain in connected mode with USIM A.

Although the preceding description was with respect to indicating whether a MSISDN is within a whitelist or black list, the present disclosure is not so limited. For example, the paging message may indicate different priorities or different values (e.g., 1, 2, 3, 4, etc.). That is, the paging message may not explicitly indicate whether the MSISDN is in a list. The paging message may indicate a value, which the UE interprets as the MSISDN in the list triggered the paging.

As indicated above, FIGS. 3-5 are provided as examples. Other examples may differ from what is described with respect to FIGS. 3-5.

Figure 6:
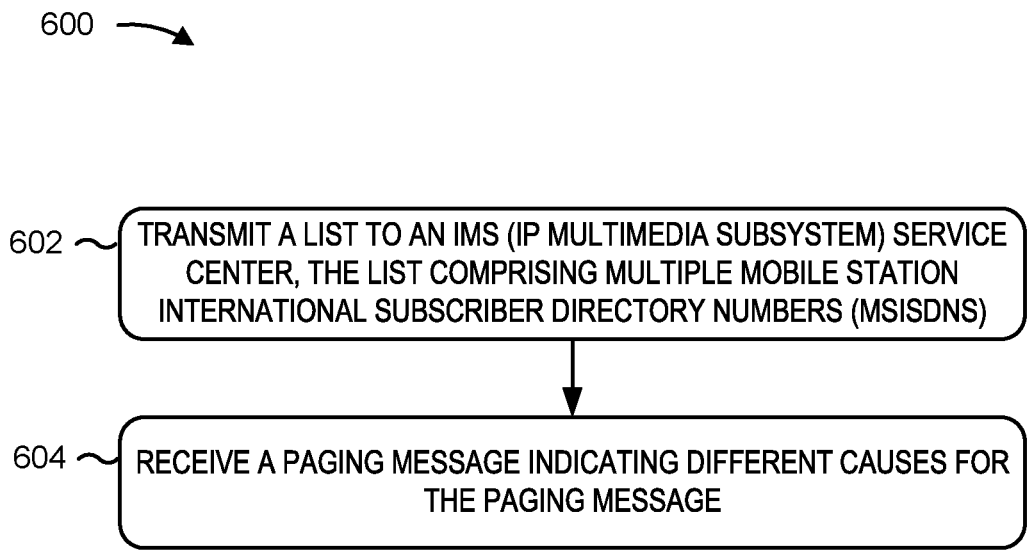
FIG. 6 is a diagram illustrating an example process performed, for example by a UE (user equipment), in accordance with various aspects of the present disclosure.

FIG. 6 is a diagram illustrating an example process 600 performed, for example, by a UE, in accordance with various aspects of the present disclosure. The example process 600 is an example of a mobile terminated paging procedure.

As shown in FIG. 6, in some aspects, the process 600 may include transmitting a list to an IMS (IP multimedia subsystem) service center, the list comprising multiple mobile station international subscriber directory numbers (MSISDNs) (block 602). For example, the UE (user equipment) (e.g., using the antenna 252, the modulator 254, the TX MIMO processor 266, the transmit processor 264, the controller processor 280, and/or the memory 282) transmits the list.

As shown in FIG. 6, in some aspects, the process 600 may include receiving a paging message indicating different causes for the paging message (block 604). For example, the UE (e.g., using the antenna 252, the demodulator 254, the MIMO detector 256, the receive processor 258, controller processor 280, and/or the memory 282) receives the page.

Figure 7:
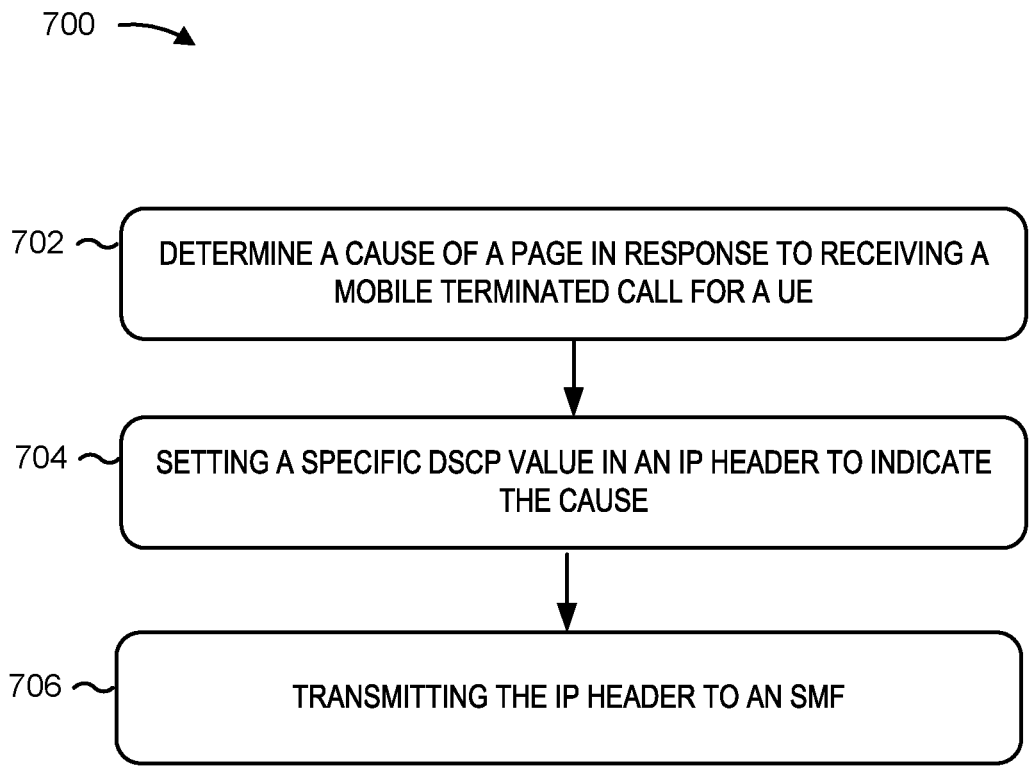
FIG. 7 is a diagram illustrating an example process performed, for example by an IMS (IP multimedia subsystem), in accordance with various aspects of the present disclosure.

FIG. 7 is a diagram illustrating an example process 700 performed, for example, by a IMS (IP multimedia subsystem), in accordance with various aspects of the present disclosure. The example process 700 is an example of a mobile terminated paging procedure.

As shown in FIG. 7, in some aspects, the process 700 may include determining a cause of a page in response to receiving a mobile terminated call for a UE (user equipment) (block 702). For example, the IMS (IP multimedia subsystem) (e.g., using the communication unit 294, controller processor 290, and/or the memory 292) determines the cause of the page.

As shown in FIG. 7, in some aspects, the process 700 may include setting a specific DSCP value in an IP header to indicate the cause (block 704). For example, the IMS (e.g., using the communication unit 294, controller processor 290, and/or the memory 292) sets the specific DSCP value.

As shown in FIG. 7, in some aspects, the process 700 may include transmitting the IP header to an SMF (session management function) (block 706). For example, the IMS (e.g., using the communication unit 294, controller processor 290, and/or the memory 292) transmits the IP header.

Figure 8:
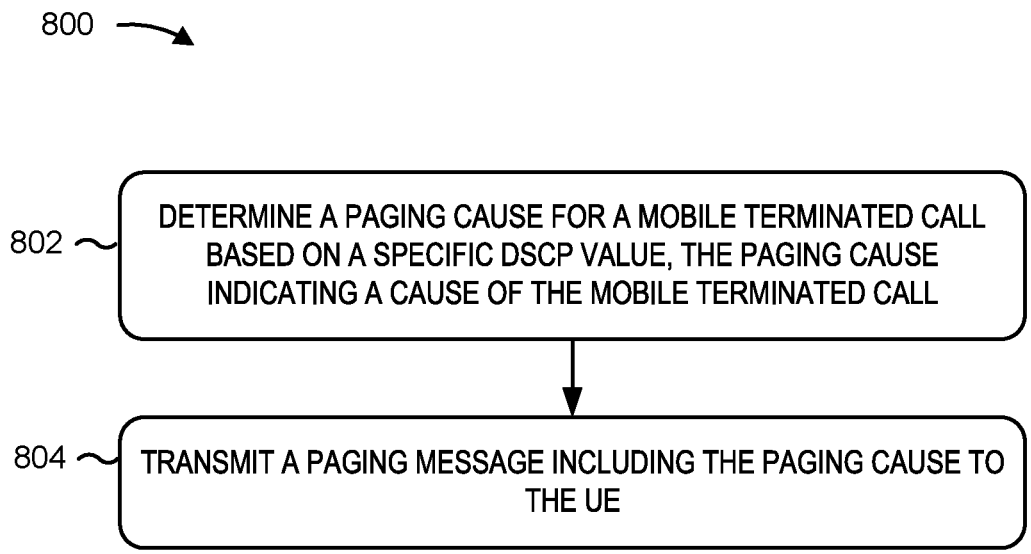
FIG. 8 is a diagram illustrating an example process performed, for example by a SMF (session management function), in accordance with various aspects of the present disclosure.

FIG. 8 is a diagram illustrating an example process 800 performed, for example, by an SMF (session management function), in accordance with various aspects of the present disclosure. The example process 800 is an example of a mobile terminated paging procedure.

As shown in FIG. 8, in some aspects, the process 800 may include determining a paging cause for a mobile terminated call based on a specific DSCP (differentiated services code point) value, the paging cause indicating a cause of the mobile terminated call (block 802). For example, the SMF (session management function) (e.g., using the communication unit 294, controller processor 290, and/or the memory 292) determines the paging cause.

As shown in FIG. 8, in some aspects, the process 800 may include transmitting a paging message including the paging cause to the UE (block 804). For example, the SMF (e.g., using the communication unit 294, controller processor 290, and/or the memory 292) transmits the paging message.

Figure 9:
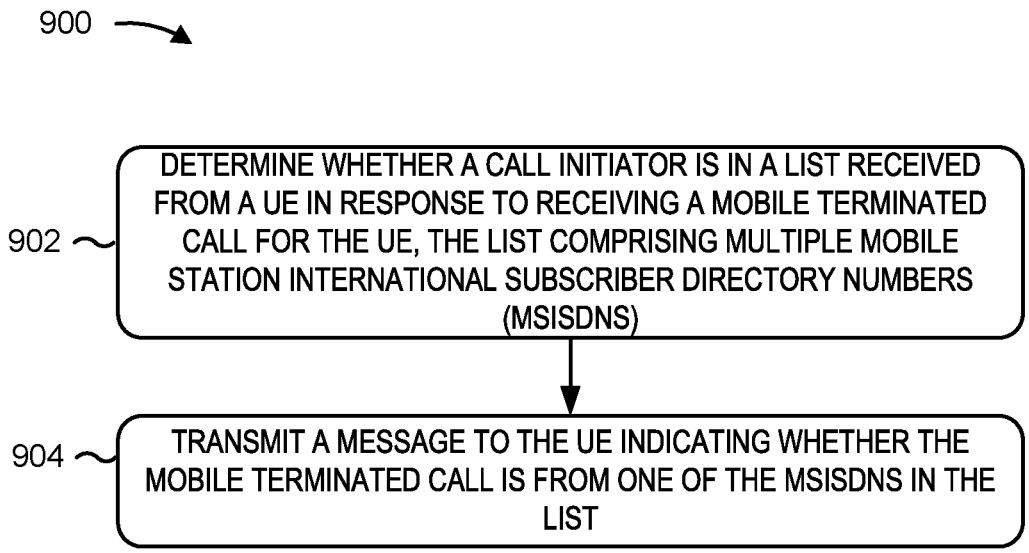
FIG. 9 is a diagram illustrating an example process performed, for example by a network, in accordance with various aspects of the present disclosure.

FIG. 9 is a diagram illustrating an example process 900 performed, for example, by a network, in accordance with various aspects of the present disclosure. The example process 900 is an example of a mobile terminated paging procedure.

As shown in FIG. 9, in some aspects, the process 900 may include determining whether a call initiator is in a list received from a UE (user equipment) in response to receiving a mobile terminated call for the UE, the list comprising multiple mobile station international subscriber directory numbers (MSISDNS) (block 902). For example, the network (e.g., using the communication unit 294, controller processor 290, and/or the memory 292) determines the call.

As shown in FIG. 9, in some aspects, the process 900 may include transmitting a message to the UE indicating whether the mobile terminated call is from one of the MSISDNS in the list (block 904). For example, the network (e.g., using the communication unit 294, controller processor 290, and/or the memory 292) transmits the message.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a UE (user equipment), comprising:
   transmitting a list to an IMS (IP multimedia subsystem) service center, the list comprising a plurality of mobile station international subscriber directory numbers (MSISDNs); and
   receiving a paging message indicating a paging cause for the paging message, the paging cause indicating whether a caller triggering the paging message is in the list.

2. The method of claim 1, in which the list comprises a whitelist of primary contacts.

3. The method of claim 1, in which the list comprises a blacklist of secondary contacts.

4. The method of claim 1, in which the UE is in connected mode on a first USIM (universal subscriber identity module) upon receiving the message on a second USIM.

5. The method of claim 4, further comprising suspending service on the first USIM, wherein the list comprises a whitelist and the call is from an MSISDN on the whitelist.

6. The method of claim 4, further comprising maintaining service on the first USIM, wherein the list comprises a blacklist and the call is from an MSISDN on the blacklist.

7. The method of claim 1, in which the transmitting is via application layer signaling.

8. The method of claim 1, further comprising receiving a definition of the paging causes in policy information.

9. A UE (user equipment) for wireless communication, comprising:
   memory, and
   at least one processor operatively coupled to the memory, the memory and the at least one processor configured:
      to transmit a list to an IMS (IP multimedia subsystem) service center, the list comprising a plurality of mobile station international subscriber directory numbers (MSISDNs); and
      to receive a paging message indicating a paging cause for the paging message, the paging cause indicating whether a caller triggering the paging message is in the list.

10. The UE of claim 9, in which the list comprises a whitelist of primary contacts.

11. The UE of claim 9, in which the list comprises a blacklist of secondary contacts.

12. The UE of claim 9, in which the UE is in connected mode on a first USIM (universal subscriber identity module) upon receiving the message on a second USIM.

13. The UE of claim 12, in which the at least one processor is further configured to suspend service on the first USIM, wherein the list comprises a whitelist and the call is from an MSISDN on the whitelist.

14. The UE of claim 12, in which the at least one processor is further configured to maintain service on the first USIM, wherein the list comprises a blacklist and the call is from an MSISDN on the blacklist.

15. The UE of claim 9, in which the at least one processor is further configured to transmit via application layer signaling.

16. The UE of claim 9, in which the at least one processor is further configured to receive a definition of the paging causes in policy information.

* * * * *